(12) United States Patent
Kerr

(10) Patent No.: US 8,254,984 B2
(45) Date of Patent: Aug. 28, 2012

(54) SPEAKER ACTIVATION FOR MOBILE COMMUNICATION DEVICE

(75) Inventor: Jim Kerr, Seattle, WA (US)

(73) Assignee: Cisco Technology, Inc., San Jose, CA (US)

( * ) Notice: Subject to any disclaimer, the term of this patent is extended or adjusted under 35 U.S.C. 154(b) by 370 days.

(21) Appl. No.: 12/587,974

(22) Filed: Oct. 14, 2009

(65) Prior Publication Data

US 2011/0086626 A1    Apr. 14, 2011

(51) Int. Cl.
*H04M 1/00* (2006.01)

(52) U.S. Cl. ............... 455/550.1; 455/418; 455/569.1; 455/575.1; 455/90.3; 455/456.1

(58) Field of Classification Search ........... 455/569.1, 455/569.2, 90.3, 575.1, 575.9, 418, 556.1, 455/550.1, 41.2, 456.1
See application file for complete search history.

(56) References Cited

U.S. PATENT DOCUMENTS

| | | | |
|---|---|---|---|
| 5,276,916 A * | 1/1994 | Pawlish et al. ............. 455/575.1 |
| 6,035,211 A * | 3/2000 | Rabe et al. ................. 455/567 |
| 6,073,033 A * | 6/2000 | Campo ...................... 455/566 |
| 6,115,620 A * | 9/2000 | Colonna et al. ............ 455/569.1 |
| 6,411,828 B1 * | 6/2002 | Lands et al. ............... 455/569.1 |
| 6,757,372 B1 | 6/2004 | Dunlap et al. | |
| 6,882,869 B1 | 4/2005 | Toebes et al. | |
| 6,940,954 B1 | 9/2005 | Toebes | |
| 7,460,881 B2 * | 12/2008 | Cho ........................... 455/550.1 |
| 7,479,949 B2 * | 1/2009 | Jobs et al. ................. 345/173 |
| 7,567,802 B2 | 7/2009 | Adachi et al. | |
| 7,577,249 B2 * | 8/2009 | Lucey et al. ............... 379/447 |
| 7,792,557 B2 * | 9/2010 | Mizuta et al. .............. 455/575.4 |
| 7,877,111 B2 * | 1/2011 | Silverbrook et al. ....... 455/557 |
| 7,957,772 B2 * | 6/2011 | Charlier et al. ............ 455/569.1 |
| 8,077,888 B2 * | 12/2011 | Trepte ....................... 381/310 |
| 2006/0094429 A1 | 5/2006 | Ramalho et al. | |
| 2007/0281668 A1 | 12/2007 | Fleming | |
| 2008/0069318 A1 | 3/2008 | McClung | |
| 2008/0169944 A1 | 7/2008 | Howarth et al. | |
| 2008/0254822 A1 * | 10/2008 | Tilley ........................ 455/550.1 |
| 2009/0170449 A1 * | 7/2009 | Xiao .......................... 455/90.1 |
| 2009/0203394 A1 | 8/2009 | Shaffer et al. | |
| 2009/0209293 A1 * | 8/2009 | Louch ........................ 455/566 |

* cited by examiner

*Primary Examiner* — Sharad Rampuria
(74) *Attorney, Agent, or Firm* — Cindy Kaplan

(57) ABSTRACT

In one embodiment, an apparatus includes a mobile communication device configured for operation in a first operating mode wherein a speaker function is off and a second operating mode wherein a speaker function is on. The mobile communication device includes a position sensor for detecting placement of the mobile communication device in a specified position and a controller for switching the mobile communication device between the first and second operating modes based on input from the position sensor. A method for speaker activation at a mobile communication device is also disclosed.

20 Claims, 3 Drawing Sheets

SPEAKER ACTIVATION FOR MOBILE COMMUNICATION DEVICE

BACKGROUND

The present disclosure relates generally to the field of communications, and more particularly, mobile communication devices.

As electronic components used in wireless communication devices have reduced in size, the number of portable communication devices has greatly increased. Portable communication devices such as mobile telephones and other handheld devices include functions which often require manipulation of one or more user interfaces to activate. For example, a user may be required to press one or more buttons or multiple touch screens or to manually close one application and select another application in order to access a desired function. Thus, activation of features on a mobile device may involve considerable user intervention and the user interface may be difficult to access while talking on the phone or performing other tasks.

DESCRIPTION OF EXAMPLE EMBODIMENTS

Overview

A method and apparatus for speaker activation at a mobile communication device are disclosed.

In one embodiment, a method generally comprises operating a mobile communication device in a first mode wherein a speaker function is off, detecting at a position sensor, placement of the mobile communication device in a specified position, and switching the mobile communication device to a second mode wherein the speaker function is on.

In another embodiment, an apparatus generally comprises a mobile communication device configured for operation in a first operating mode wherein a speaker function is off and a second operating mode wherein a speaker function is on. The mobile communication device comprises a position sensor for detecting placement of the mobile communication device in a specified position and a controller for switching the mobile communication device between the first and second operating modes based on input from the position sensor.

Example Embodiments

The following description is presented to enable one of ordinary skill in the art to make and use the invention. Descriptions of specific embodiments and applications are provided only as examples, and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, details relating to technical material that is known in the technical fields related to the invention have not been described in detail.

Embodiments described herein allow a user to activate a speaker upon placing a mobile communication device in a specified position. The mobile communication device may be any suitable equipment that supports wireless communication, including for example, a mobile phone, portable phone, personal digital assistant, wireless enabled portable computing device, multimedia device, wireless access protocol device, or any other device operable to provide wireless access to communication services.

Figure 1:
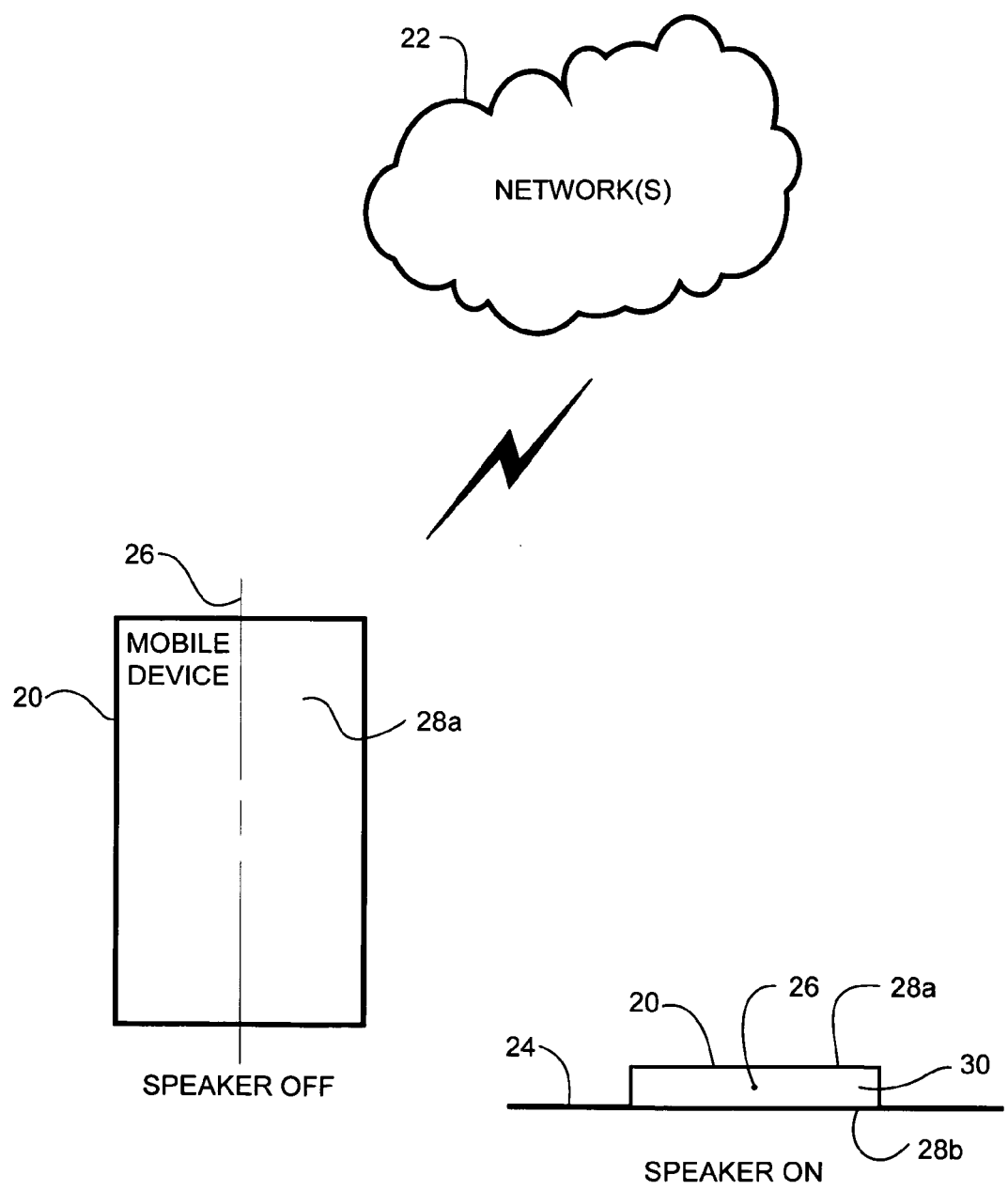
FIG. 1 illustrates an example of a mobile communication device in a speaker off mode and a speaker on mode, and in communication with one or more networks.

Referring now to the drawings, and first to FIG. 1, a mobile communication device 20 is shown in two operating modes. In a first operating mode, the mobile device is configured to operate with a speaker function in an off state ("SPEAKER OFF" in FIG. 1). The first operating mode is preferably a default mode of operation for the mobile device 20. Any calls received while the mobile device 20 is in its first operating mode will require a user to place the mobile device near the user's ear to listen to audio from the device. If the mobile device 20 is equipped with Bluetooth technology and the mobile device has an open connection with a Bluetooth device, communication may also occur on a Bluetooth headset in speaker off mode. In a second operating mode, the mobile device 20 is configured to operate with a speaker function in an on state ("SPEAKER ON" in FIG. 1). The speaker function operates to transmit audio from the device so that one or more users can hear the audio without the device placed near the user's ear. The mobile device 20 thus operates as a speaker phone when in speaker mode.

The mobile device 20 is configured for communication with one or more networks 22 including, for example, a cellular network, the Internet, an intranet, a satellite network, a mobile data network, local area network (LAN), wide area network (WAN), and the like, or any combination thereof. For example, a user may communicate with other users or user devices over a wireless telephone network or a data network, using VoIP (Voice over Internet Protocol). The network 22 may be any network capable of transmitting audio communication signals or data including signals or data transmitted through phone calls or other audio transmissions.

As shown in the example of FIG. 1, the mobile communication device 20 includes faces 28a, 28b (one may be referred to as a front face and the other a back face) and four sides 30. A longitudinal axis 26 of the mobile device 20 extends generally parallel to at least one of the faces 28a, 28b of the device. In one embodiment, the mobile device 20 operates in speaker mode when it is placed on a generally planar support surface 24 with a longitudinal axis 26 of the device extending generally parallel to a plane of the surface. In the example shown in FIG. 1, the mobile device 20 is placed such that one of the front or back faces (28a, 28b) of the mobile device is in contact with the horizontal surface 24 while the other of the front and back faces and sides of the device are not in direct contact with the surface.

The surface 24 may be a table, counter, desk, book shelf, computer, chair, floor, or any other object with a generally flat surface to support the mobile device 20. The surface 24 may also be a support or console located in a car, for example. Importantly, there is no mating connection required between the mobile device 20 and surface 24 as is present with a docking station or connection to a port, for example.

Figure 2:
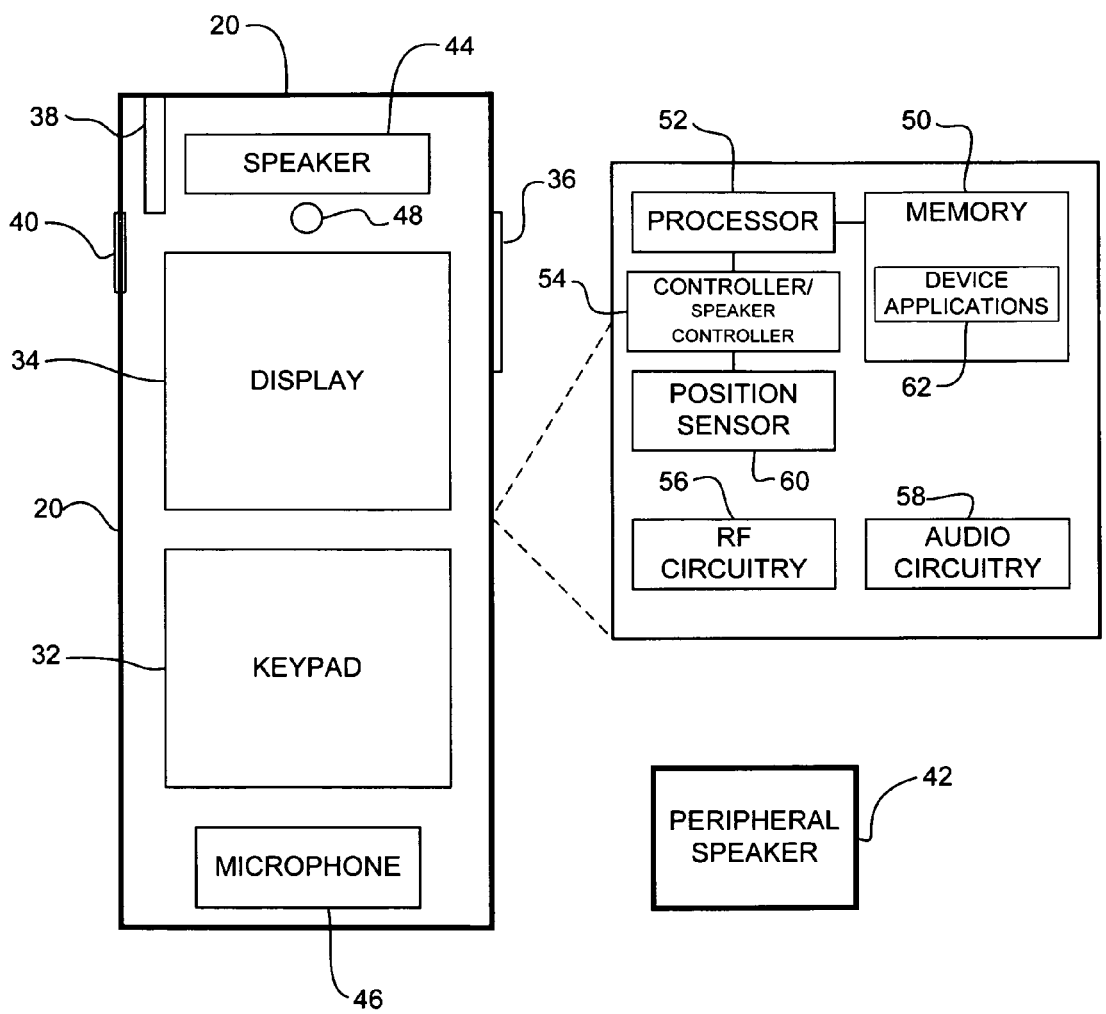
FIG. 2 is a diagram illustrating an example of a mobile communication device that may be used to implement embodiments described herein.

FIG. 2 illustrates an example of a mobile device 20 in which embodiments described herein may be implemented. The mobile device 20 includes a keypad 32 comprising multiple keys (not shown) used in operation of the device, and a visual display 34. The keypad 32 may also be a touch screen, which may be integrated with the display 34. The keypad 32 may include numeric keys, alphabetic keys, standard telephone keys, or any other icons or symbols. The display of the keypad 32 or individual keys may also change based on the application currently operating on the device 20. The mobile device 20 may include any number of other user interfaces such as one or more manual buttons (e.g., switch 36), a mouse, or other interface. The user can select and activate device options by touching a screen or pressing buttons, for example. The device 20 also includes an antenna 38, which may be internal or external to the device, for wireless communications. The mobile device 20 may also comprise an optical sensor (e.g., built-in camera) 48 on one or more faces 28a, 28b of the device. One or more external ports 40 may be provided for connection with another input or output device such as a peripheral speaker 42. The peripheral speaker 42 may also be a wireless device configured for wireless communication with the mobile device 20.

The device 20 further includes one or more speakers 44 and one or more microphones 46. The speaker 44 provides audio output to a user and the microphone 46 provides audio input from the user. In one embodiment, the device 20 includes a mouthpiece microphone located generally at one end of the phone and an earpiece speaker located generally at the other end of the phone. The mouthpiece microphone and earpiece speaker are configured for use when the mobile device 20 is placed near a user's head so that the mouth piece microphone is located adjacent to the user's mouth and the earpiece speaker is adjacent to the user's ear. The device 20 may also include a separate microphone configured to gather remote sounds when the device is placed in speaker mode or the same microphone may be used for both modes of operation. The device 20 may also include a conference speaker configured to be heard by any person within several feet of the device, while the earpiece speaker is configured to be heard by a single individual whose ear is near the earpiece speaker. In some embodiments, only one speaker 44 is used for both modes, with the volume of the speaker adjusted for speaker mode operation. If a separate speaker is used for speaker mode, the speaker may be positioned anywhere on the device (i.e., front face 28a, back face 28b, or sides 30). Also, the device 20 may be configured to operate using the peripheral speaker 42 during operation in speaker mode. The peripheral speaker 42 may be, for example, a small speaker that can be installed in an automobile or a desktop speaker.

The term "speaker mode", "speaker on", or "speaker function on" as used herein refers to operation of the conference mode speaker or if a single speaker is used, operation of the speaker in a speakerphone mode. The term "speaker off", "speaker mode off", or "speaker function off" as used herein refers to operation of the earpiece speaker or if a single speaker is used, operation of the speaker at a low volume for use by a user with mobile device placed near the user's head, or in the case of no active audio communications, all speakers off.

It is to be understood that the device 20 shown in FIG. 2 and described herein is only one example of a mobile communication device, and that the device may have additional, fewer or different components or a different arrangement or configuration of components, without departing from the scope of the invention. For example, other suitable input or output devices may be used along with various applications.

As illustrated in the block diagram of FIG. 2, the device 20 further includes memory 50, one more processors 52, controller (including speaker controller) 54, RF (Radio Frequency) circuitry 56, audio circuitry 58, and a position sensor 60.

Memory 50, which may include one or more computer readable storage mediums, may be any form of volatile or nonvolatile memory, including for example random access memory (RAM), read-only memory (ROM), magnetic media, optical media, flash memory, removable media, or any other suitable local or remote memory component. Memory 50 may store any data or information, including software and encoded logic, utilized by the mobile device 20. Memory 50 may store signal data received by the device 20 or data that may be maintained by the position sensor 60. Memory 50 also includes software components such as device applications 62 and an operating system.

The one or more processors 52 run or execute various code, software programs, or instructions stored in memory 50 to perform various functions for the device 20 and to process data. Logic may be encoded in one or more tangible media for execution by the processor 52. For example, memory 50 can be utilized to store and retrieve software programs incorporating computer code that implements aspects of the invention, data for use with the invention, and the like. The mobile device 20 includes any suitable combination of hardware, software, or encoded logic operable to send and receive data or signals to and from the network 22 or other devices.

The RF circuitry 56 receives and transmits RF signals and converts electrical signals to/from electromagnetic signals and communicates with communication networks 22 and other communication devices via the electromagnetic signals. The audio circuitry 58, speaker 44, and microphone 46 provide an audio interface between the user and the device 20.

The controller 54 provides for management and control of various elements within the device 20. For example, the controller 54 may access information maintained within memory 50 and control other elements to interact with users and other communication devices. The controller 54 also operates as a speaker controller that interacts with the position sensor 60 to initiate a switch from one operational mode to another operational mode. A corresponding user interface (e.g., light or icon on display 34) may output a signal to signify that the speaker mode is active.

The position sensor 60 detects the position or relative position of the mobile device 20. In one embodiment, the position sensor 60 enables detection of different manual manipulation, including, for example, orientation, motion, contact, etc. For example, the position sensor 60 may include a motion detector, accelerometer, gravity meter, gyroscope, capacitive or resistance touch sensor, proximity sensor, optical sensor, RFID (Radio Frequency Identification), or any other device configured to determine that the mobile device 20 has been placed in a specified position to initiate switching operation to speaker mode. The specified position may be, for example, a generally horizontal position, laid generally flat (face up, face down, or either face up or face down), contact between one of the faces 28a, 28b and a surface, placement in a predetermined location or near a specified object, or in view of a specified image. The controller 54 may include a delay so that the mobile device has to remain in its position for a specified amount of time before the operating mode of the device is switched, to prevent inadvertent toggling between operating modes.

The following are examples of position sensors 60 that may be used to initiate switching of the mobile device 20 between its operational modes.

In one embodiment, the position sensor 60 determines the orientation of the device (e.g., horizontal, vertical) based on analysis of data received from one or more accelerometers. The accelerometer may detect movement of the mobile device 20 along any axis (e.g., horizontal, vertical) or any combination of planes (e.g., three dimensional movement).

A proximity or touch sensor may also be used to identify that one of the faces 28a, 28b of the device 20 has been placed in contact with a surface. Input from the proximity sensor may be used alone or in combination with input from the accelerometers. Input from a combination of sensors may thus be used to determine that the mobile device has been placed in a specified position.

In another embodiment, the position sensor 60 utilizes the optical sensor 48 combined with video processing to detect its position relative to a known image. The optical sensor 48 may be positioned on the front, back, or both faces (28a, 28b), or one or more sides 30 of the mobile device 20. The optical sensor 48 may be a charge-coupled device, complementary metal-oxide semiconductor (CMOS), or any other suitable device. The optical sensor 48 receives light projected through one or more lenses and converts the light to data representing an image. The optical sensor provides input to the controller 54 that can be used to determine that the mobile device 20 has been placed face down on a surface. For example, if light is blocked from one or more optical sensors, this information either alone or in combination with other input, may be used to determine that at least one face of the mobile device 20 is in contact with a surface. Also, a specific pattern may be used on a liner or mat for the support surface 24 so that anytime the optical sensor and associated processing recognizes the pattern, the mobile device 20 is switched to its speaker mode. The optical sensor 48 may also recognize a pattern such as ceiling tiles in an office building, for example, so that the position sensor 60 can determine that the optical sensor is facing the ceiling.

In another embodiment, the position sensor 60 utilizes wireless triangulation to identify that the mobile device 20 has been placed in a specified position based on its location. Placement of the mobile device 20 on a surface may be determined by calculating the location of the device in 3D space through the use of wireless signal triangulation compared with a known location. For example, in an enterprise environment, specified locations (e.g., conference rooms) may be mapped out within an office building or complex. The device 20 may use any combination of WiFi, GPS (global positioning system), or a cellular radio to determine its position. For example, the mobile device 20 may identify WiFi networks that are in range, measure signal strength, and compare those results with a database stored in memory 50.

In another embodiment, the position sensor 60 utilizes RFID tag/reader technology. An RFID device may be located in a conference room or on a desktop, for example. The scanner creates an electromagnetic field which interacts with the RFID tag causing the RFID tag to emit a radio signal. When the RFID tag comes within range of the reader, the mobile device 20 initiates switching to speaker mode.

It is to be understood that the position sensors 60 described above are only examples and that other technologies may be used to detect placement of the mobile device 20 in a specified position. Also, the position sensor 60 may utilize any of the above described embodiments individually or combine input from two or more of the technologies described herein.

Figure 3:
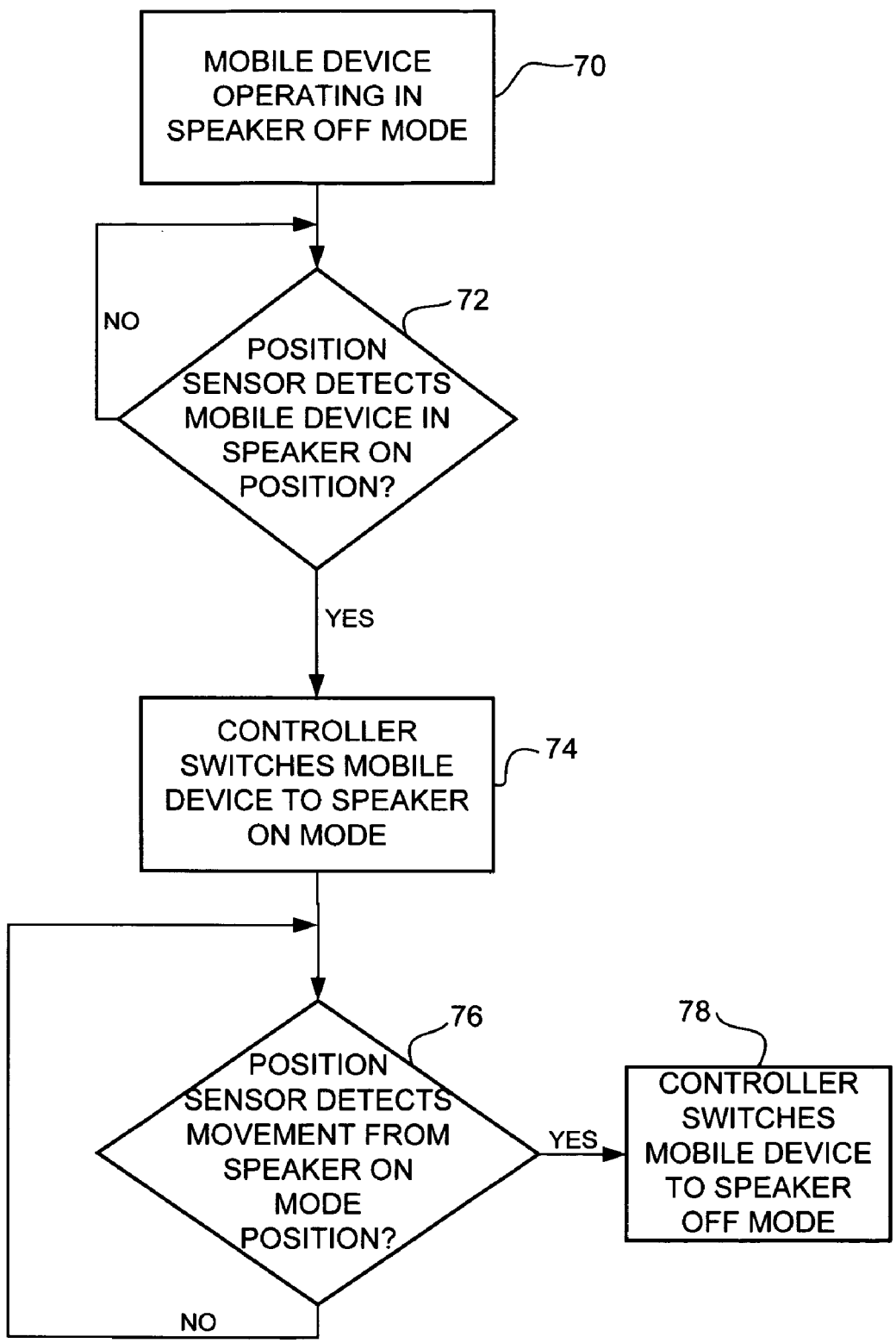
FIG. 3 is a flowchart illustrating an overview of a process for utilizing the speaker mode of the mobile communication device, in accordance with one embodiment.

FIG. 3 is a flowchart illustrating an overview of a process for detecting placement of the mobile communication device 20 in a specified position and switching operating modes of the device. At step 70, the mobile device 20 operates in a first mode in which the speaker function is off. If the position sensor 60 detects placement of the mobile communication device 20 in a specified position (step 72), the controller 54 switches the mobile device 20 to speaker mode (step 74). For example, the position sensor 60 may detect that the mobile device 20 has been placed face down (or up) on a surface. The position sensor 60 then notifies the controller 54, which switches the mobile device to its second mode of operation in which the speaker function is on. If the position sensor 60 detects that the mobile device 20 is no longer in position for speaker mode, the controller 54 may switch the device back to its first operating mode and turn off the speaker function (steps 76 and 78).

Steps may be added to or removed from the process illustrated in FIG. 3. For example, if a phone application is currently inactive, the controller 54 may not automatically switch the device 20 to speaker mode. In one embodiment, the mobile device 20 may prompt the user to approve activation of speaker mode before switching operating modes if there is not currently an active call (e.g., phone is not in use). If the mobile device 20 is placed in speaker mode when there is no active call, the device may wait until a call is received to operate the speaker mode. If there is an active call, the mobile device 20 preferably activates the speaker function immediately. The call then continues with the mobile device in speaker mode. In another embodiment, the speaker mode may be automatically turned on whenever the phone is laid on a surface so that the speaker can be used for applications other than a phone call (e.g., listen to music, audio broadcast, etc.).

The mobile device 20 may also check the status of other applications before switching to speaker mode. For example, the controller 54 may first check to see if the device 20 is currently connected to a Bluetooth headset. If the Bluetooth connection is active, the controller 54 may not switch the device 20 to speaker mode. The mobile device 20 may also include an override selection, which will turn off the speaker mode regardless of placement of the device 20.

Also, the mobile device 20 may perform additional steps before switching off speaker mode (step 78). For example, the controller 54 may only switch the speaker mode off following step 76 if the call is no longer active so that the speaker mode is not turned off inadvertently during a call.

As can be observed from the foregoing, the embodiments described herein provide numerous advantages. For example, rather than navigating through a menu or pressing buttons or screens in order to enter a specified mode, a user can intuitively lay the phone down to enter the mode. This feature is particularly advantageous for a speaker function since it eliminates the need for user input in order to switch the phone to speaker mode during a phone call or upon receiving a phone call.

It is understood that the examples and embodiments that are described herein are for illustrative purposes only and that various modifications and changes in light thereof will be suggested to persons skilled in the art and are to be included within the spirit and purview of this application and scope of the appended claims and their full scope of equivalents.

What is claimed is:
1. A method comprising:
   operating a mobile communication device in a first mode wherein a speaker function is off;
   detecting at an optical sensor, placement of the mobile communication device in a specified position; and
   switching the mobile communication device to a second mode wherein said speaker function is on;
   wherein placement of the mobile communication device in a specified position comprises placement of the mobile communication device in a position wherein the optical sensor is directed towards a surface comprising a specified pattern.

2. The method of claim 1 wherein said placement of the mobile communication device in a specified position comprises placement of the mobile communication device on a generally planar support surface with a longitudinal axis of the mobile communication device extending generally parallel to a plane of the support surface.

3. The method of claim 1 wherein said placement of the mobile communication device in a specified position comprises placement of the mobile communication device such that a front or back face of the mobile communication device is in contact with a generally planar support surface comprising the pattern and the other of said front or back face and sides of the mobile communication device are not in direct contact with said surface.

4. The method of claim 1 wherein the pattern is located on a surface adjacent to the mobile communication device.

5. The method of claim 4 wherein the pattern is formed on a liner configured for placement on a support surface.

6. The method of claim 1 wherein detecting placement of the mobile communication device in a specified position further comprises wireless interaction of the position sensor with an external device.

7. The method of claim 1 further comprising activating a speaker on the mobile communication device when the device is in its second mode.

8. The method of claim 1 further comprising activating a peripheral speaker when the device is in its second mode.

9. An apparatus comprising:
a mobile communication device configured for operation in a first operating mode wherein a speaker function is off and a second operating mode wherein a speaker function is on, the mobile communication device comprising:
an optical sensor for detecting placement of the mobile communication device in a specified position; and
a controller for switching the mobile communication device between said first and second operating modes based on input from the optical sensor;
wherein placement of the mobile communication device in a specified position comprises placement of the mobile communication device in a position wherein the optical sensor is directed towards a surface comprising a specified pattern.

10. The apparatus of claim 9 wherein said placement of the mobile communication device in a specified position comprises placement of the mobile communication device on a generally planar support surface with a longitudinal axis of the mobile communication device extending generally parallel to a plane of the support surface.

11. The apparatus of claim 9 wherein said placement of the mobile communication device in a specified position comprises placement of the mobile communication device such that a front or back face of the mobile communication device is in contact with a generally planar support surface comprising the pattern and the other of said front or back face and sides of the mobile communication device are not in direct contact with said surface.

12. The apparatus of claim 9 wherein the pattern corresponds to ceiling tiles.

13. The apparatus of claim 9 further comprising a sensor operable to utilize wireless triangulation for use in detecting placement of the mobile communication device in said specified position.

14. The apparatus of claim 9 further comprising a Radio Frequency Identification device operable to provide input to the controller.

15. The apparatus of claim 9 further comprising an interface for communication with a peripheral speaker, wherein the peripheral speaker is activated when the mobile communication device is in its second operating mode.

16. The apparatus of claim 9 wherein the controller is configured to automatically switch to said second operating mode upon receiving input that the mobile communication device is in said specified position only if a phone application on the device has an active call.

17. An apparatus comprising:
means for detecting at a mobile communication device, placement of the mobile communication device in a specified position; and
means for switching the mobile communication device from a first mode wherein a speaker function is off to a second mode wherein said speaker function is on;
wherein means for detecting placement of the mobile communication device in a specified position comprises a sensor operable to use wireless triangulation to identify a location of the mobile communication device.

18. The apparatus of claim 17 wherein said placement of the mobile communication device in a specified position comprises placement of the mobile communication device on a generally planar support surface with a longitudinal axis of the mobile communication device extending generally parallel to a plane of the support surface.

19. The apparatus of claim 17 wherein said placement of the mobile communication device in a specified position comprises placement of the mobile communication device such that a front or back face of the mobile communication device is in contact with a generally planar support surface comprising a specified pattern and the other of said front or back face and sides of the mobile communication device are not in direct contact with said surface.

20. The apparatus of claim 17 wherein means for switching comprises means for activating a peripheral speaker.

* * * * *